(12) United States Patent
Ramsay

(10) Patent No.: US 8,098,283 B2
(45) Date of Patent: Jan. 17, 2012

(54) METHODS, SYSTEMS, AND COMPUTER PROGRAM PRODUCTS FOR IMPLEMENTING A PERSONALIZED, IMAGE CAPTURE AND DISPLAY SYSTEM

(76) Inventor: Shaka Ramsay, Boston, MA (US)

( * ) Notice: Subject to any disclaimer, the term of this patent is extended or adjusted under 35 U.S.C. 154(b) by 1203 days.

(21) Appl. No.: 11/832,028

(22) Filed: Aug. 1, 2007

(65) Prior Publication Data
US 2009/0033772 A1 Feb. 5, 2009

(51) Int. Cl.
*H04N 7/18* (2006.01)
(52) U.S. Cl. ........ 348/180; 348/130; 348/155; 348/142; 348/144; 348/146
(58) Field of Classification Search .................. 348/180, 348/206, 155, 207.1, 142, 144, 146
See application file for complete search history.

(56) References Cited

U.S. PATENT DOCUMENTS

| 2004/0039592 A1* | 2/2004 | Shima ............................... 705/1 |
| 2004/0263611 A1* | 12/2004 | Cutler ............................. 348/36 |
| 2009/0089186 A1* | 4/2009 | Paolini ............................ 705/27 |
| 2010/0111370 A1* | 5/2010 | Black et al. .................... 382/111 |
| 2010/0302348 A1* | 12/2010 | Richards ......................... 348/36 |

* cited by examiner

*Primary Examiner* — Djenane Bayard
(74) *Attorney, Agent, or Firm* — Cantor Colburn LLP

(57) ABSTRACT

A method, system, and computer program product for implementing image capture and display services are provided. The system includes an enclosure having an opening through which a subject enters, an imaging system encircling the enclosure, a computer processor device communicatively coupled to the imaging system, and an application executing on the computer processor device. The system also includes an image capture activation component in communication with the computer processor device and a display device in communication with the computer processor device. In response to activating the image capture activation component, the application issues a first command to the imaging system, the first command causing the imaging system to capture images of the subject in the enclosure.

17 Claims, 4 Drawing Sheets

METHODS, SYSTEMS, AND COMPUTER PROGRAM PRODUCTS FOR IMPLEMENTING A PERSONALIZED, IMAGE CAPTURE AND DISPLAY SYSTEM

BACKGROUND OF THE INVENTION

The present disclosure relates generally to business services, in particular, to methods, systems, and computer program products for implementing a personalized, image capture and display system.

The clothing retail industry has become an increasingly competitive business. As more and more retail establishments enter the market, existing businesses need to find new and interesting ways to continue to attract customers. Providing exemplary service to customers and a clean, safe shopping environment are some ways in which businesses provide value. Niche stores, e.g., those catering to specific consumers, create an ambience with special décor and lighting. These elements are found to be visually appealing to the targeted consumers and can help establish brand recognition. For example, stores catering to younger consumers display televisions, which provide music videos.

The shopping experience for clothing consumers can be stressful, particularly during peak shopping hours. This is due in part, to the added time required for trying on clothing, returning to the clothing racks to find more clothing items or a different size, and returning again to the fitting room. Deciding on a purchase can be especially difficult where multiple items have been tried on and the consumer has no means of comparing the fit and feel of items previously tried on to the currently worn item without retrying the previous items. This time consuming and often frustrating process can certainly detract from the overall shopping experience.

What is needed, therefore, is a way to offer fitting room services that reduce the time involved in shopping for clothing items and provide a more desirable shopping experience.

BRIEF SUMMARY OF THE INVENTION

Exemplary embodiments of the invention include methods, systems, and computer program products for implementing image capture and display services. The system includes an enclosure having an opening through which a subject enters, an imaging system encircling the enclosure, a computer processor device communicatively coupled to the imaging system, and an application executing on the computer processor device. The system also includes an image capture activation component in communication with the computer processor device and a display device in communication with the computer processor device. In response to activating the image capture activation component, the application issues a first command to the imaging system, the first command causing the imaging system to capture images of the subject in the enclosure.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE EXEMPLARY EMBODIMENTS

Figure 1:
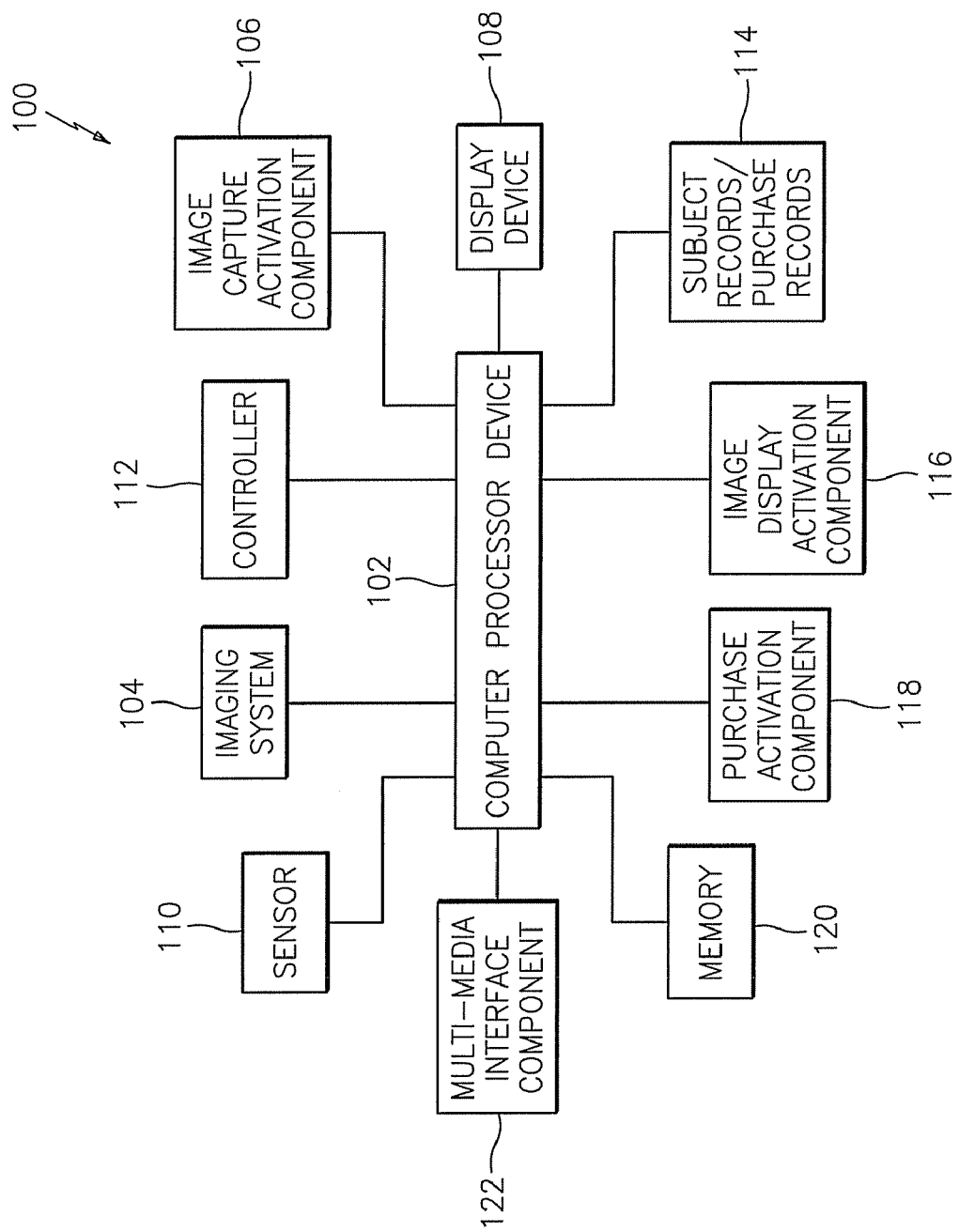
FIG. 1 is a schematic diagram of a system upon which image capture and display services may be implemented in exemplary embodiments.
Figure 2:
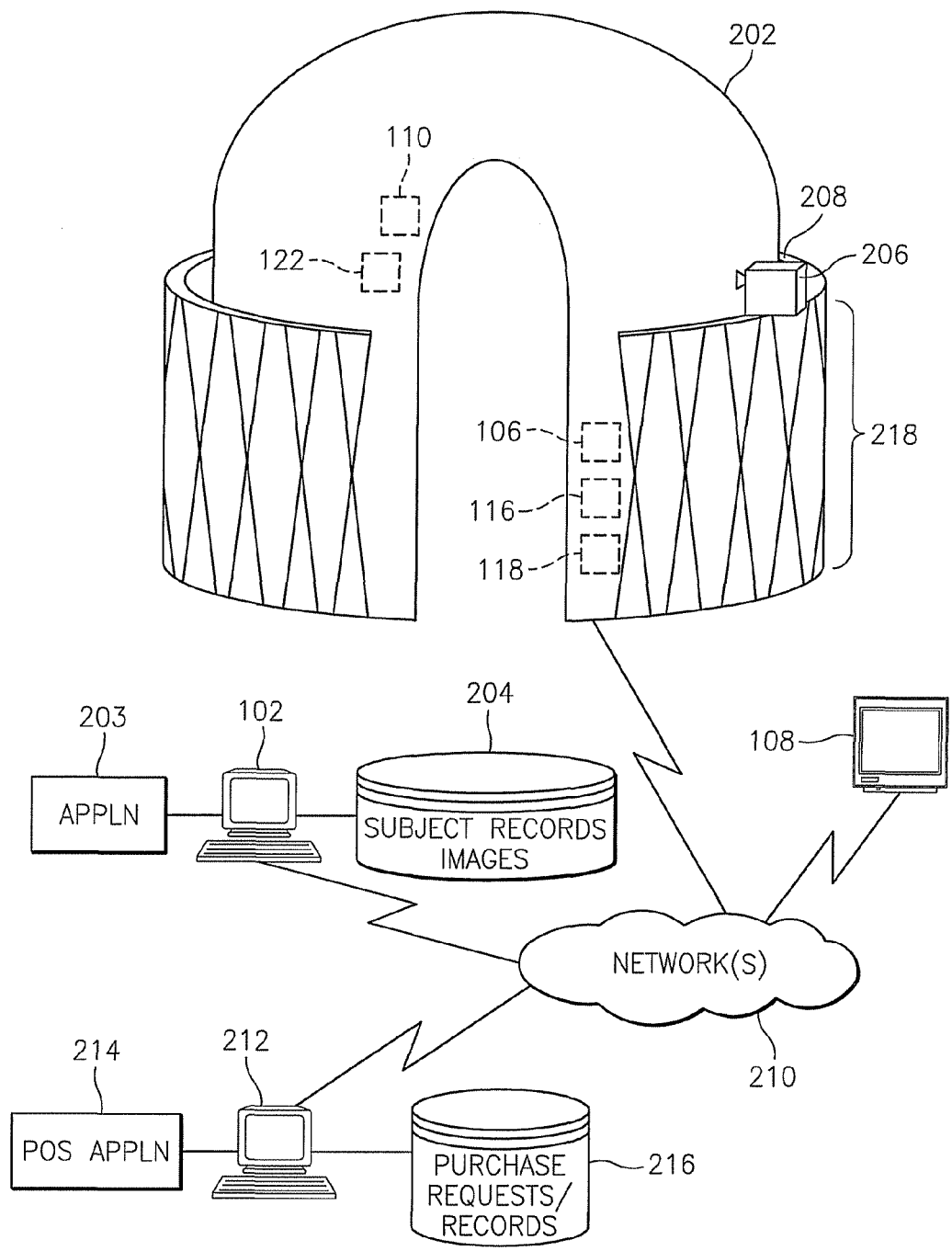
FIG. 2 illustrates a networked system architecture for implementing image capture and display services in exemplary embodiments.

Turning now to FIGS. 1 and 2, a system upon which the image capture and display services may be implemented in exemplary embodiments will now be described. The system 100 of FIG. 1 includes a computer processor device 102 in communication with an imaging system 104, a display device 108, and memory 120. The computer processor device 102 may be implemented, e.g., via a general-purpose computer, such as a desktop or laptop computer. The computer processor device 102 executes an application 203 for implementing the image capture and display services as described further herein. The computer processor device 102 may be implemented in a wireline or wireless fashion.

Figure 4:
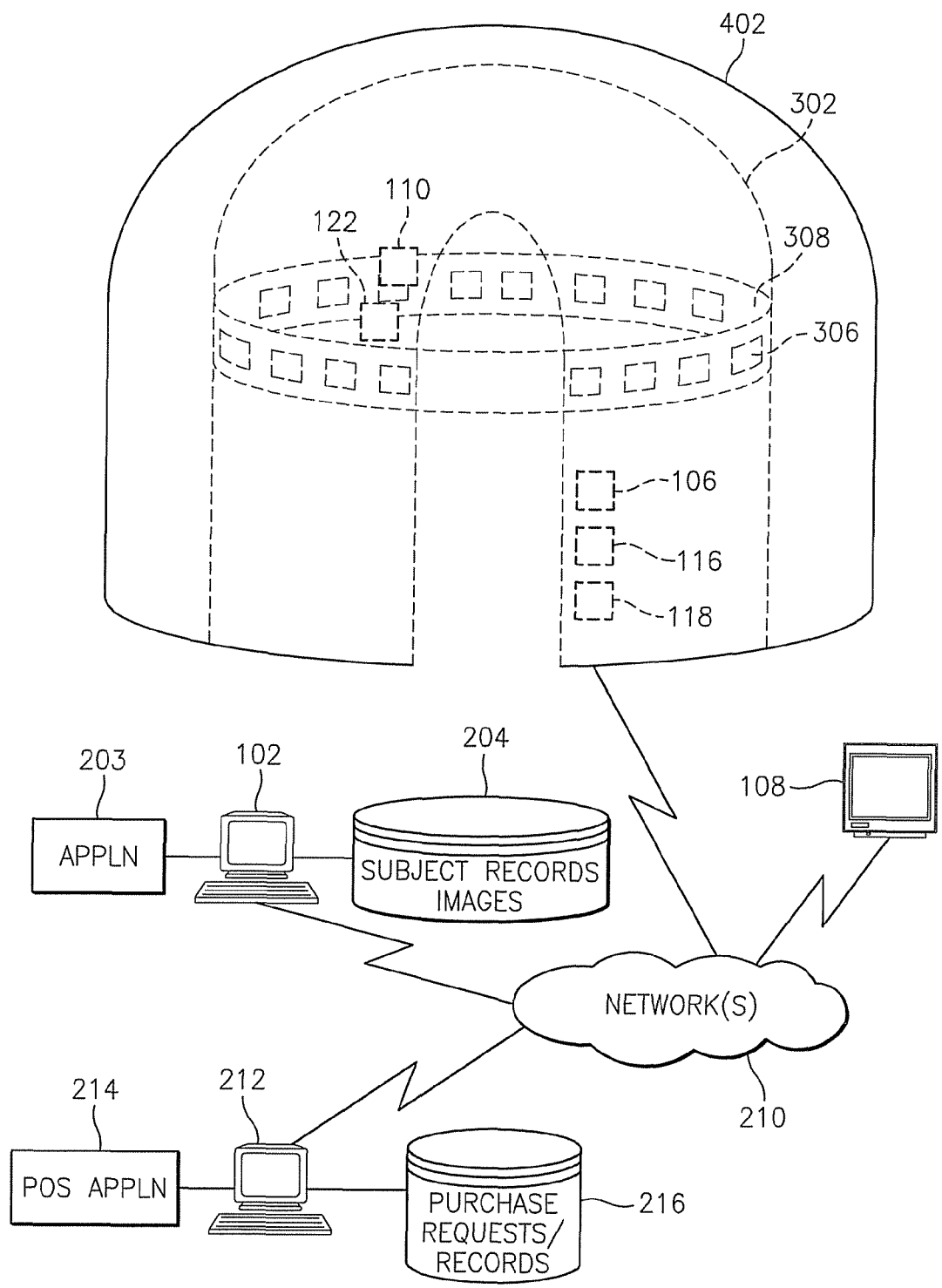
FIG. 4 illustrates a networked system architecture for implementing image capture and display services in further alternative exemplary embodiments.

Imaging system 104 surrounds an external area of an enclosure 202. In exemplary embodiments, the enclosure 202 is a fitting room or similar enclosed area at a clothing store within which individuals may try on clothing items. The enclosure 202 illustrated in FIG. 2 is shaped in a cylindrical or semi-spherical shape. However, it will be understood that other configurations may be employed for the enclosure 202 in order to realize the advantages of the invention. For example, the enclosure 202 may have a parallelepiped shape. In exemplary embodiments, the enclosure 202 is formed from a transparent or semi-transparent material through which the imaging system captures images of subjects within the enclosure 202. In alternative exemplary embodiments, the imaging system 104 may be disposed inside of the enclosure 202, in which case the enclosure 202 need not be formed of transparent materials. In yet further exemplary embodiments, the enclosure 202 may be encapsulated by a second enclosure for privacy (see FIG. 4). Enclosure 202 includes an opening through which a subject enters (e.g., an individual trying on clothing items).

As shown in FIG. 2, the imaging system 104 encircles the enclosure 202 and includes components, such as an image capturing device 206 mounted on a motorized track 208. The motorized track 208 is disposed on a frame 218 and extends in a horizontal direction with respect to the enclosure and in parallel with a base of the enclosure 202. The image capturing device 206 traverses the motorized track 208 along a horizontal axis of the enclosure and which spans substantially 360 degrees around the enclosure 202 capturing images of a subject within the enclosure 202. The images captured may be still images or may be video images.

Memory 120 may include storage located within the computer processor device 102 or other location that is logically addressable by the computer processor device 102. The display device 108 displays images captured by the image capturing device 206. The display device 108 may be, e.g., a computer monitor or closed circuit television that is in communication with the computer processor device 102. The display device 108 may be disposed inside of, or nearby the enclosure 202. Alternatively, the display device 108 may be remotely situated; that is, outside of the clothing store.

The computer processor device 102 and enclosure 202 are in communication with each other via one or more networks 210. Network(s) 210 may be any type of known networks including, but not limited to, a wide area network (WAN), a local area network (LAN), a global network (e.g. Internet), a virtual private network (VPN), and an intranet. The network(s) 210 may be implemented using a wireless network or any kind of physical network implementation known in the art.

Also included in the system 100 is an image capture activation component 106. The image capture activation component 106 may be implemented by a control switch or similar means. Upon invocation of the image capture activation component 106, a signal (also referred to herein as "first command") is transmitted to the imaging system 104 via the application 103, which initiates operation of the motorized track 208 and image capturing device 206. The image capturing device 206 traverses the motorized track 208 and captures images of the subject in the enclosure 202. The images are captured at various angles spanning substantially 360 degrees around the enclosure 202. Once the image capturing device 206 completes the traversal of the motorized track 208, operation thereof is suspended. The captured images may be stored in the memory of the computer processor device 102.

In one exemplary embodiment, the image capture activation component 106 is installed within the enclosure 202 and is activated by the subject in the enclosure 202. Advantageously, in this embodiment, the subject in the enclosure maintains control of the operation of the imaging system 104. In an alternative exemplary embodiments, the image capture activation component 106 is installed outside of the enclosure 202 for operation by someone other than the subject (e.g., a sales associate within the clothing store). By installing the image capture activation component 106 outside of the enclosure 202 for operation by a sales associate, the subject is then encouraged to interact with a sales associate, which can result in greater sales opportunities.

In an exemplary embodiment, a sensor 110 is also included in the system 100 of FIG. 1. The sensor 110 is installed in the enclosure 202 and is in communication with the computer processor device 102 via, e.g., networks 210. The sensor 110 detects entrance of a subject to the enclosure 202 and acquires height information of the subject. The height information is used to determine an optimal placement of the image capture device 106 with respect to a vertical or longitudinal axis of the enclosure 202. For example, the application 203 may be configured to designate an optimal placement as 40 percent to 60 percent of the height of the subject in order to maximize the quality of the captured images. The frame 218, upon which the motorized track 208 is disposed, may be vertically adjustable for this purpose. In this embodiment, the frame 218 may include a controller 112 that receives a signal (also referred to herein as "second command") from the computer processor device 102 to adjust the frame height. In alternative embodiments, the height of the frame 218 may be manually adjusted, in which case the sensor 110 need not be installed. The sensor 110 may be implemented, e.g., as an optical sensor or 3D point sensor.

The system 100 of FIG. 1 also includes an image display activation component 116. Upon invocation of the image display activation component 116, the application 203 retrieves the captured images from a database 204 in memory 120 and transmits the captured images to display device 108, which then displays the images captured for the subject (collectively referred to herein as "third command"). If the display device 108 is installed in the enclosure 202, then the image display activation component 116 is also installed in the enclosure 202 (as shown in FIG. 2). However, if the display device 108 is installed outside of the enclosure 202, the image display activation component 116 is installed on or near the display device 108.

For privacy, it may be desirable for each subject to have exclusive access to the images captured while in the enclosure 202. The application 203 enables the subject to provide identifying information whereby the application 203 creates a subject record and associates the subject record with the corresponding captured images. The subject records may be distinguished using any suitable means for identification. For example, the subject record may contain data fields, such as subject name, subject address, and a unique identifier (e.g., random generated personal identification number (PIN) code). In order to retrieve the captured images, the subject would be authenticated by the application 203 via, e.g., the PIN code. In this manner, the subject is ensured that unauthorized access to the captured images will not occur. The subject may also have the option to permanently delete the captured images via the application 203 in order to protect the privacy of the subject. These features may be implemented in several ways. For example, the subject may approach a sales representative who creates the subject record for the subject. Alternatively, the application 203 may include a Web-based user interface in which the subject may create his/her own record prior to visiting the store by entering personal information via the user interface. In addition, the subject record may be re-usable in that the subject may store captured images over a period of time and may further store the images captured from multiple visits to the store. In this manner, the subject, who may be undecided about a purchase, is afforded the opportunity to revisit the store at a later time without having to re-try on clothing items. In addition, the captured images may be made available to the subject at home or in the office by accessing the user interface over networks 210, authenticating the subject, and retrieving the images. Thus, with the images stored in memory, the subject may retrieve multiple images taken over a period of time by issuing a fourth command via the application.

In alternative exemplary embodiments, the system 100 of FIG. 1 includes a multi-media interface component 122 in communication with the computer processor device 102. The multi-media interface component 122 enables the subject to transfer captured images from the memory 120 and store them on a personal electronic device (e.g., cellular telephone, personal digital assistant, personal computer, etc.). Again, the subject would be authenticated prior to transferring the images. The multi-media interface component 122 may be installed in the enclosure 202 or elsewhere in the store.

Advanced, value-added services may also be provided by the image capture and display system. In an exemplary embodiment, a purchase activation component 118 may be included in the system 100 of FIG. 1. The purchase activation component 118 may be installed in the enclosure 202 for quick and easy access by the subject, or may be installed elsewhere in the store. The purchase activation component 118 may include a radio frequency identification (RFID) system that enables a subject to scan a clothing label via the component 118 in order to initiate a purchase. A computer processor device 212 is included in the system 100 of FIG. 1 for managing purchase activities. While two computer processor devices 102 and 212 are shown in FIG. 2 for ease of explanation, it will be understood that a single computer processor device may be implemented for handling all of the functionality of the image capture and display services including purchase activities. The computer processor device 212 executes a point-of-sale (POS) application 214 for executing purchase activities (e.g., bar code translation, invoice creation, remote banking transactions, etc.). In this embodiment, the subject record also includes data fields for implementing a purchase, such as bank routing information, credit card number/expiration date, etc. Upon invocation, the purchase activation component 118 scans the bar code of the item for purchase and transmits the information along with the subject record information to the POS application 214 (also referred to herein as "fifth command"). This information is referred to herein as a purchase request. Advantageously, a subject may purchase a clothing item without waiting in line at a checkout counter. The purchase requests/records are stored in a database 216 of the computer processor device 212.

Figure 3:
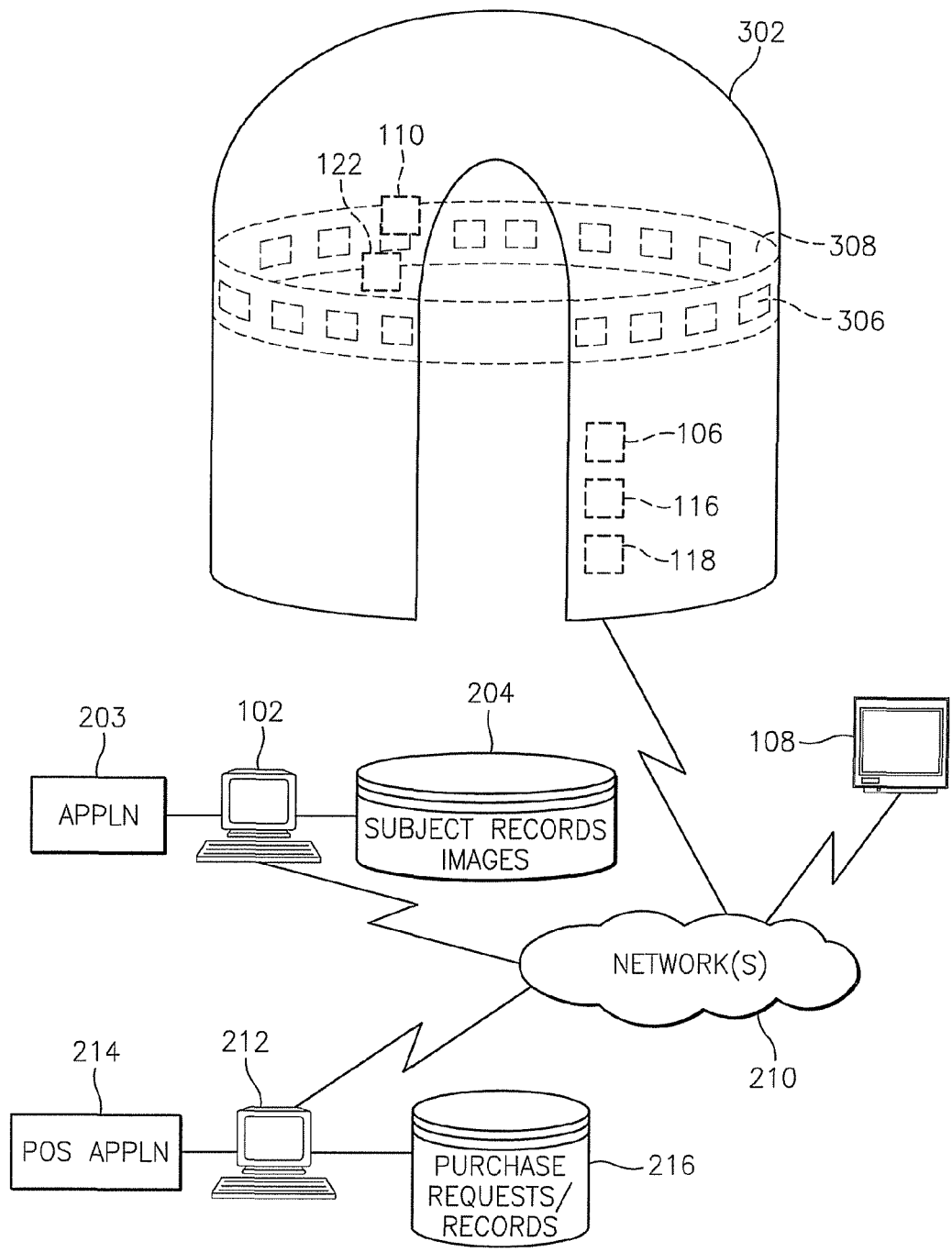
FIG. 3 illustrates a networked system architecture for implementing image capture and display services in alternative exemplary embodiments.

Turning now to FIG. 3, an alternative exemplary embodiment of an enclosure 302 will now be described. Many of the elements shown in FIG. 3 are substantially similar or identical to those described above in FIG. 1. To this extent, these features will not be described. The enclosure 302 includes a ring 308, or ring-shaped frame, in which multiple image capturing devices 306 are embedded. The ring and the image capturing devices 306 may be formed on an inner surface of the enclosure 302. Upon invocation of the image capture activation component 106, each of the image capturing devices 306 capture, in sequence, an image of the subject (via a first command). The image capturing devices 306 may be still image capturing devices or video image capturing devices.

As described above, the invention can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for implementing image capture and display services, comprising:
    an enclosure having an opening through which a subject enters;
    an imaging system encircling the enclosure;
    a computer processor device communicatively coupled to the imaging system;
    an application executing on the computer processor device;
    an image capture activation component in communication with the computer processor device; and
    a display device in communication with the computer processor device;
    wherein, in response to activating the image capture activation component, the application issues a first command to the imaging system, the first command causing the imaging system to capture images of the subject in the enclosure, the system further comprising:
    a sensor in communication with the computer processor device and the imaging system, the sensor acquiring height data of the subject, the height data transmitted to the computer processor device;
    wherein, in response to receiving the height data, the application calculates an optimum longitudinal placement of the imaging system, the optimum longitudinal placement established at a range between 40 to 60 percent of the height; and
    wherein, the application issues a second command to a controller of the imaging system, the controller adjusting the longitudinal placement of the imaging system prior to activation of the image capture activation component.

2. The system of claim 1, wherein the imaging system captures images along a horizontal axis of the enclosure and at varying angles spanning substantially 360 degrees around the enclosure.

3. The system of claim 1, further comprising an image display activation component in communication with the computer processor device;
    wherein, in response to activating the image display activation component, the application issues a third command to the display device, the third command causing the display device to display the captured images.

4. The system of claim 3, further comprising memory for storing the captured images;
    wherein activating the image display activation component further includes issuing a fourth command to retrieve multiple captured images and simultaneously display the multiple captured images on the display device.

5. The system of claim 1, wherein the enclosure is a fitting room, the subject is an individual trying on a clothing item, and the captured images include a series of images captured from varying angles for each of the clothing items worn by the individual.

6. The system of claim 5, further comprising:
    a subject identifier component that identifies the subject;
    a clothing identifier component that identifies a selected captured image; and a purchase activation component in communication with the computer processor device;

wherein, upon selecting the purchase activation component and the selected captured image, the application issues a fifth command to a purchasing system, the fifth command transmitting a purchase request to the purchasing system, the purchase request including the identifier of the subject and the identifier of the selected captured image.

7. The system of claim 1, wherein the imaging system comprises at least one of:

an image capturing device mounted on a motorized track, the image capturing device traversing the motorized track, the motorized track extending in a horizontal direction with respect to the enclosure and in parallel with a base of the enclosure; and multiple image capturing devices fixably mounted on a frame that extends in a horizontal direction with the enclosure and in parallel with a base of the enclosure.

8. The system of claim 1, further comprising a multi-media interface component for transferring selected captured images to a remote device, the remote device including at least one of:

a cellular telephone;
a personal digital assistant; and
a personal computer.

9. A method for implementing image capture and display services, comprising:

activating an imaging system that encircles an enclosure, the enclosure including an opening through which a subject enters;

in response to the activating, the imaging system captures images of the subject in the enclosure; and displaying the captured images on a display device;

wherein the imaging system captures the images along a horizontal axis of the enclosure and at varying angles spanning substantially 360 degrees around the enclosure, the method further comprising:

acquiring height data of the subject;

calculating an optimum longitudinal placement of the imaging system from the height data, the optimum longitudinal placement established at a range between 40 to 60 percent of the height; and adjusting the longitudinal placement of the imaging system prior to activating the imaging system.

10. The method of claim 9, further comprising:

retrieving multiple captured images from memory and simultaneously displaying the multiple captured images on the display device.

11. The method of claim 9, wherein the enclosure is a fitting room, the subject is an individual trying on a clothing item, the captured images include a series of images captured from varying angles for each of the clothing items worn by the individual, and the display device is disposed in the fitting room.

12. The method of claim 9, further comprising:

transmitting a purchase request to a purchasing system in response to selecting a purchase activation component and a selected purchase, the purchase request including an identifier of the subject and an identifier of a selected captured image.

13. The method of claim 9, further comprising transferring selected captured images to a remote device, the remote device including at least one of:

a cellular telephone;
a personal digital assistant; and
a personal computer.

14. A computer program product for implementing image capture and display services, the computer program product comprising a non-transitory computer-readable storage medium having instructions embodied thereon, which when executed by a computer cause the computer to implement a method, the method comprising:

activating an imaging system that encircles an enclosure, the enclosure including an opening through which a subject enters;

in response to the activating, the imaging system captures images of the subject in the enclosure; and displaying the captured images on a display device;

wherein the imaging system captures the images along a horizontal axis of the enclosure and at varying angles spanning a substantially 360 degrees around the enclosure, the method further comprising:

acquiring height data of the subject;

calculating an optimum longitudinal placement of the imaging system from the height data, the optimum longitudinal placement established at a range between 40 to 60 percent of the height; and adjusting the longitudinal placement of the imaging system prior to activating the imaging system.

15. The computer program product of claim 14, further comprising instructions for implementing:

retrieving multiple captured images from memory and simultaneously displaying the multiple captured images on the display device.

16. The computer program product of claim 14, wherein the enclosure is a fitting room, the subject is an individual trying on a clothing item, the captured images include a series of images captured from varying angles for each of the clothing items worn by the individual, and the display device is disposed in the fitting room.

17. The computer program product of claim 14, further comprising instructions for implementing:

transmitting a purchase request to a purchasing system in response to selecting a purchase activation component and a selected purchase, the purchase request including an identifier of the subject and an identifier of a selected captured image.

* * * * *